(12) United States Patent
Tanaka et al.

(10) Patent No.: US 10,944,940 B1
(45) Date of Patent: Mar. 9, 2021

(54) INTERCOM SYSTEM FOR COLLECTIVE HOUSING

(71) Applicant: Aiphone Co., Ltd., Aichi-ken (JP)

(72) Inventors: Kohei Tanaka, Aichi-ken (JP); Yuta Shimomura, Aichi-ken (JP); Masashi Hattori, Aichi-ken (JP); Shion Kanai, Aichi-ken (JP)

(73) Assignee: Aiphone Co., Ltd., Aichi-ken (JP)

( * ) Notice: Subject to any disclaimer, the term of this patent is extended or adjusted under 35 U.S.C. 154(b) by 0 days.

(21) Appl. No.: 16/834,211

(22) Filed: Mar. 30, 2020

(30) Foreign Application Priority Data

Mar. 24, 2020 (JP) ................. JP2020-52722

(51) Int. Cl.
*H04N 7/18* (2006.01)
*G07C 9/00* (2020.01)
*H04N 5/225* (2006.01)
*H04M 3/436* (2006.01)

(52) U.S. Cl.
CPC ......... *H04N 7/186* (2013.01); *G07C 9/00904* (2013.01); *H04M 3/436* (2013.01); *H04N 5/2253* (2013.01)

(58) Field of Classification Search
CPC combination set(s) only.
See application file for complete search history.

(56) References Cited

U.S. PATENT DOCUMENTS

| 10,084,924 | B2* | 9/2018 | Maruyama | H04M 11/025 |
|---|---|---|---|---|
| 2007/0016914 | A1* | 1/2007 | Yeap | G06F 21/554 |
| | | | | 719/328 |
| 2007/0189483 | A1* | 8/2007 | Yamakawa | H04L 12/66 |
| | | | | 379/159 |
| 2014/0282752 | A1* | 9/2014 | Fan | H04M 11/025 |
| | | | | 725/80 |
| 2017/0289359 | A1* | 10/2017 | Keller | H04L 67/025 |
| 2018/0027124 | A1* | 1/2018 | Maruyama | H04M 9/00 |
| | | | | 379/167.02 |
| 2019/0138706 | A1* | 5/2019 | Tanaka | G16H 10/60 |

FOREIGN PATENT DOCUMENTS

JP 2008-79105 A 4/2008

\* cited by examiner

*Primary Examiner* — Phung-Hoang J Nguyen
(74) *Attorney, Agent, or Firm* — Harness, Dickey & Pierce, P.L.C.

(57) ABSTRACT

An intercom system for collective housing comprises a main entrance station with a camera, a residential entrance substation with a camera and a residential master station for each residence in the housing, a storage unit that stores videos (V1) of visitors shot by the camera of the main entrance station by associating the videos with residence IDs of the respective residences to visit, and a control unit. The control unit includes a check unit that checks the videos (V1) against a video (V2) shot by the camera of a residential entrance substation. If the check by the check unit indicates a match, the control unit compares the residence ID associated with the match stored in the storage unit with that of the residence in which a call button of the residential entrance substation has been operated. The operation of the call button is invalidated if the IDs are different.

7 Claims, 6 Drawing Sheets

Visitation History Table

| Residence ID | Video V1 of the Visitor | Release Time |
|---|---|---|
| 101 | V1a | 12:30 on January 11, 2020 |
| 102 | V1b | 13:00 on January 11, 2020 |
| 103 | V1c | 18:15 on January 11, 2020 |
| 104 | V1d | 17:56 on January 11, 2020 |

FIG. 4

INTERCOM SYSTEM FOR COLLECTIVE HOUSING

CROSS REFERENCE TO RELATED APPLICATION

This application claims priority to and the benefit of Japanese Patent Application No. 2020-52722, filed on Mar. 24, 2020, the entire contents of which are incorporated herein by reference.

FIELD

The present invention generally relates to intercom systems, and more specifically to an intercom system for collective housing that prevents unauthorized visitors from calling the master stations of residences in the collective housing.

BACKGROUND

In conventional intercom systems for collective housing, in order to maintain security and prevent crime, a technology has been used to allow visitors to call residential master stations installed inside of respective residences from a main entrance station installed in the main entrance to the collective housing and, upon obtaining permission from the respective residents, allow the visitors to enter the common area connected with the front doors of the respective residences. For example, Japanese Unexamined Patent Application Publication No. 2008-79105 discloses an intercom system in which a resident notifies a visitor in advance of a predetermined call number so that the visitor can call the resident only by using the call number in the system, thus preventing a thief or a high-pressure salesperson from knowing or determining that the resident is absent from home.

SUMMARY

Problem to be Solved by the Invention

In collective housing, there has been a problem that a suspicious or dubious person may enter the housing through the main entrance by tailgating a resident or an authorized visitor and call a resident of the intended residence from the substation at the entrance of that residence.

In view of the above-identified problems, an important object of the present invention is to provide an intercom system for collective housing that can prevent unauthorized visitors from calling residential master stations in the collective housing so as to improve the security of the collective housing.

Means to Solve the Problem

The present invention provides an intercom system for collective housing, the intercom system comprising: a main entrance station that includes a selection means for allowing one or more visitors to select a residence to visit in the collective housing, the main entrance station further including a camera for shooting images of the one or more visitors; a residential master station installed inside of each residence in the collective housing; a residential entrance substation for each residence that includes a call means for calling the residential master station of the residence and a camera for shooting a video of a person who has operated the call means; a control means for controlling the intercom system; and a storage means for storing the image of each visitor and the residence that the visitor is to visit by associating the image of the visitor with that residence; wherein the control means includes a check means for checking the videos of the one or more visitors against the video of the person who has operated the call means; and wherein if the check by the check means indicates a match and if the residence to visit does not match the residence in which the call means of the residential entrance substation has been operated, the control means invalidates the operation of the call means.

In one aspect of the present invention, the storage means may be installed on the cloud server.

In another aspect, each residence of the collective housing includes an electronic residential lock, wherein if the check by the check means indicates a match and if the residence to visit matches the residence in which the call means of the residential entrance substation has been operated, the control means may release the electronic residential lock.

In still another aspect of the present invention, a main entrance of the collective housing includes a main entrance electronic lock. In addition, the residential master station of each residence includes a release means for releasing the main entrance station electronic lock, and the control means invalidates the operation of the call means after a lapse of a predetermined period of time from the operation of the selection means by the visitor.

In one embodiment, the storage means may include a visitation history table that stores and associates the videos of the one or more visitors, residence IDs of the residences to be visited by the one or more visitors, release times at which the electronic lock of the main entrance is released by residents of the collective housing to admit the one or more visitors with one another.

The intercom system may further comprise an electronic residential lock on an entrance of each of the residences, in which if the check by the check means indicates a match and if the residence to visit matches the residence in which the call means of the residential entrance substation has been operated, the control means may call the residential master station of the residence in which the call means of the residential entrance substation has been operated.

In a further aspect, when the operation of the call means is invalidated, the residential entrance substation that has been operated issues an alert indicating that the operation of the call means is invalid.

Advantageous Effects of the Invention

The intercom system of the present invention shoots videos or captures images of one or more visitors authorized by residents with the camera of the main entrance station; stores information about the one or more visitors and the residences to be visited by associating or correlating the one or more visitors with the respective residences; checks a person who has operated the call means of a residential entrance substation against the one or more visitors; and invalidates the operation of the call means if the check indicates a match and if the residence to be visited does not match the residence where the residential entrance substation is installed. In this way, as the residential master station is called only if the person at the residence is the right visitor, the present invention provides a beneficial effect of preventing anyone other than a legitimate visitor from calling the residential master station.

BRIEF DESCRIPTION OF THE DRAWINGS

FIG. 4 shows an example of a visitation history table of the intercom system shown in FIG. 1.

DETAILED DESCRIPTION

Figure 1:
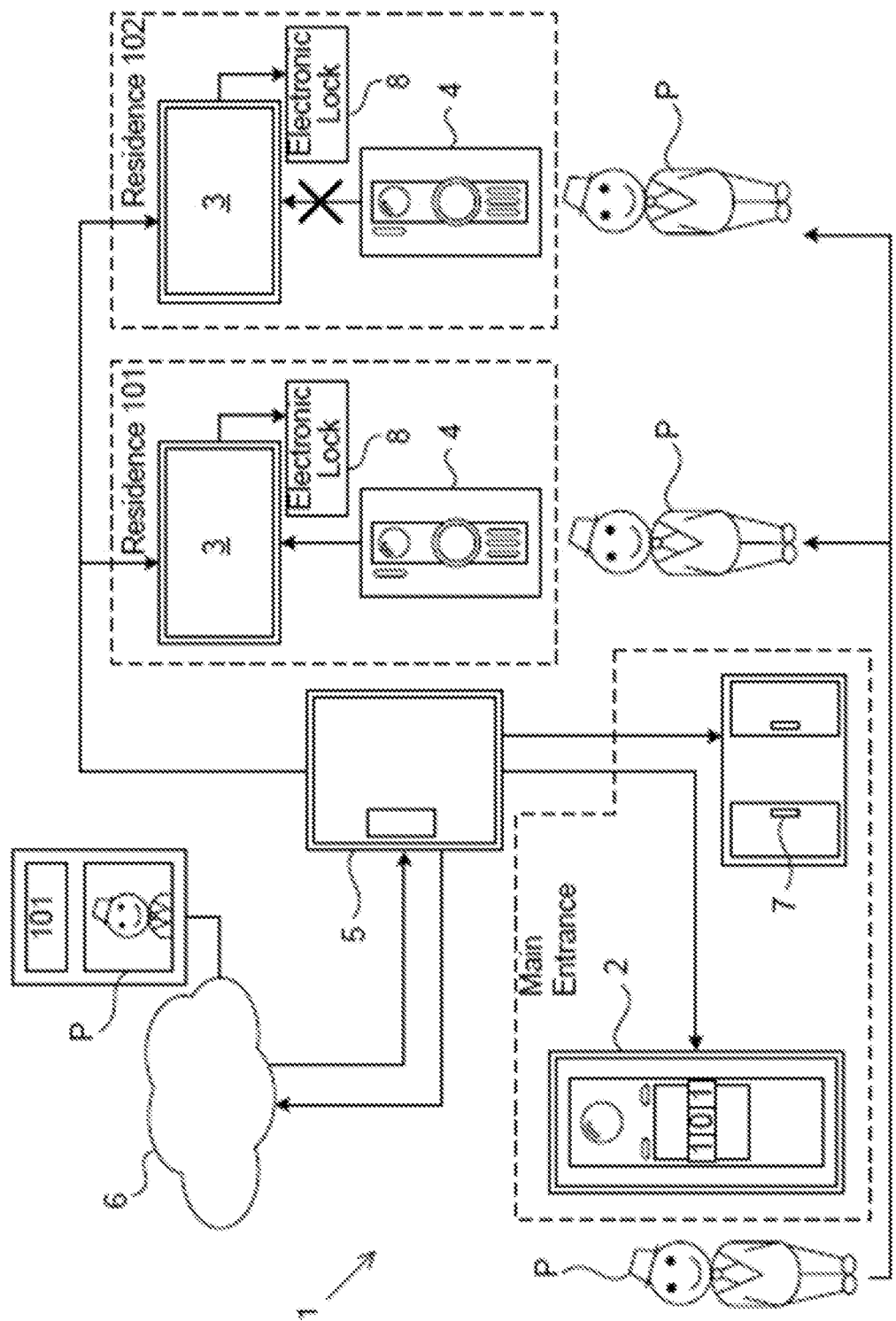
FIG. 1 is a schematic diagram of an intercom system for collective housing according to one embodiment of the present invention.
Figure 2:
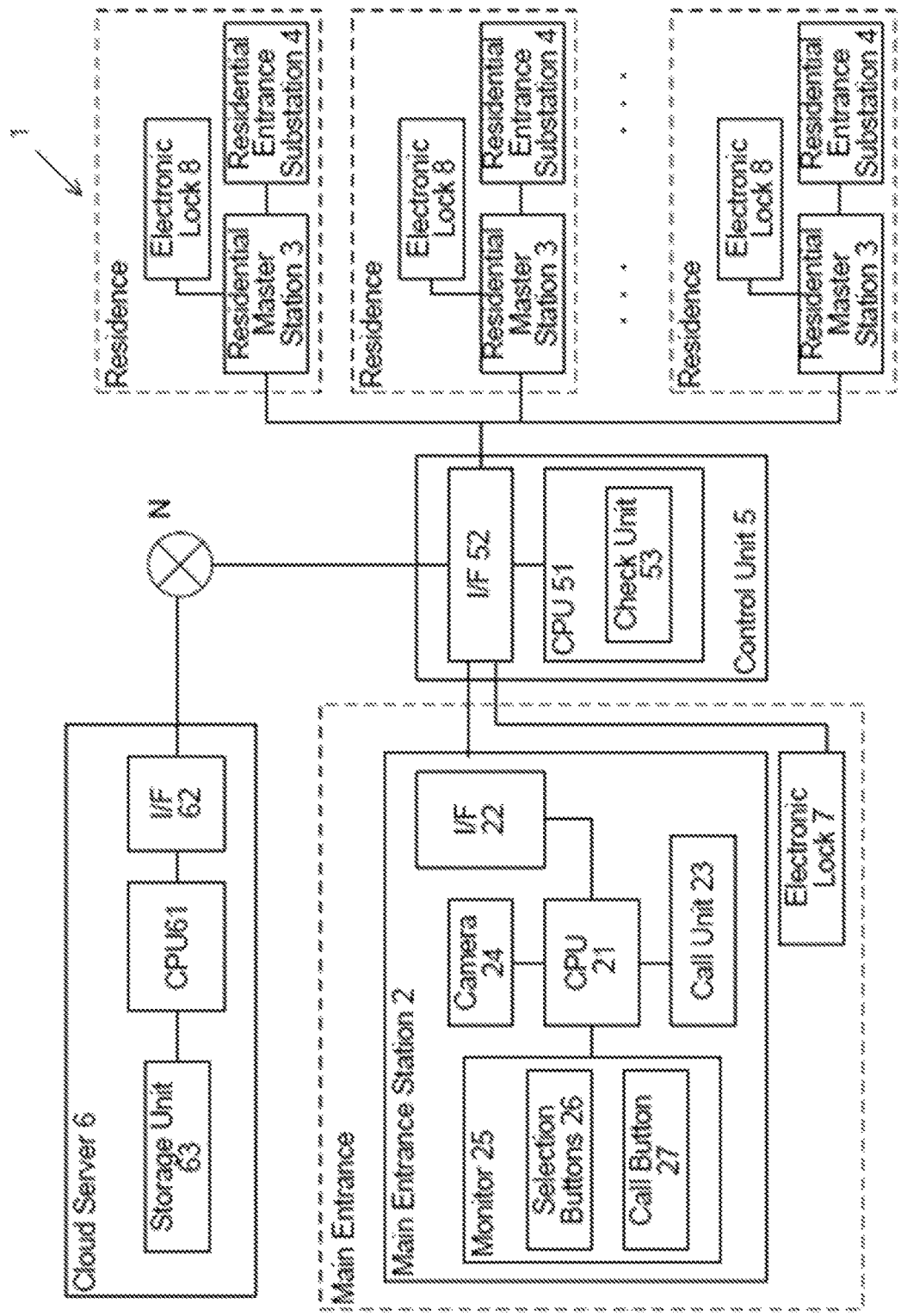
FIG. 2 is a block diagram of the intercom system shown in FIG. 1.
Figure 3A:
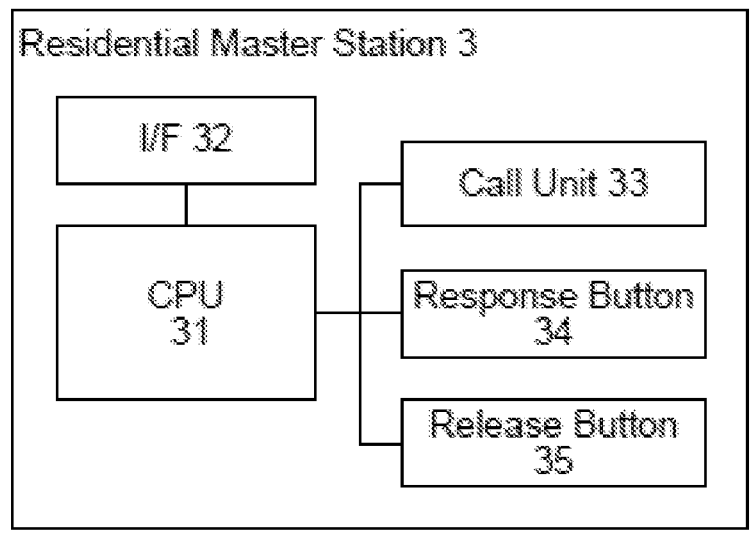
FIG. 3A is a block diagram that shows the residential master station of each residence shown in FIG. 1.
Figure 3B:
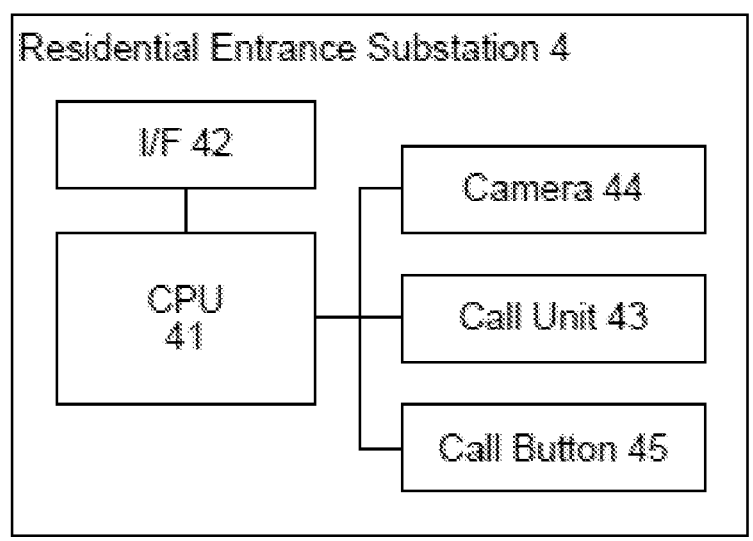
FIG. 3B is a block diagram that shows the residential entrance substation of each residence shown in FIG. 1.

An intercom system for collective housing, such as multifamily dwellings, that embodies the present invention will be described hereinafter with reference to the attached drawings. As shown in FIGS. 1-3, the intercom system 1 of this embodiment comprises a main entrance station 2 installed in the main entrance of collective housing, an electronic lock 7 for the main entrance, a cloud server 6 installed on the Internet, a residential master station 3 installed inside of each residence in the collective housing, a residential entrance substation 4 installed at the entrance of each residence, an electronic residential lock 8 installed at the entrance of each residence, and a control unit 5 that controls the overall operation of the intercom system 1.

The main entrance station 2 comprises a monitor 25 that displays operation guidance and the results of operation, etc., a call unit 23 including a microphone and a speaker that allows a visitors P to speak with a residence, a camera 24 that shoots videos V1 of visitors P or captures images V1 of visitors P (see FIG. 4), a CPU 21 that controls the operation of the main entrance station 2, and an interface 22 that connects the main entrance station 2 and external devices, such as the control unit 5. In this example, the monitor 24 is a touch panel that includes selection buttons 26 that serves as selection means for visitors P to select the residences they wish to visit, and a call button 27 that provides a call means for visitors P to call the residential master stations 3 of the residences the visitors have selected. It should be noted that the monitor 24 may, for example, comprise mechanical buttons, instead of a touch panel.

The cloud server 6 comprises a storage unit 63 that stores the residence selected to visit by each visitor P via the selection buttons 26 of the main entrance station 2 and a video V1 of the visitor P by associating or correlating the residence to visit with the video V1 of the visitor P, a CPU 61 that controls the operation of the cloud server 6. The cloud server 6 also comprises an interface 62 that connects the cloud server 6 with external devices, such as the control unit 5, via the Internet N.

Each residential master station 3 comprises a call unit 33 including a microphone and a speaker that allow a resident to speak with a visitor P, a response button 34 that allows a resident to respond to a call from a visitor P, a release button 35 that allows a resident to release the electronic locks 7 and 8 of the main entrance and the residence, respectively, a CPU 31 that controls the operation of the residential master station 3, and an interface 32 that connects the residential master station 3 with external devices, such as the control unit 5, the residential entrance substation 4, and the electronic residential lock 8. Upon receiving a video V2 from the residential entrance substation 4, the residential master station 3 transmits the video to the control unit 5 along with the residence ID of the residence.

Each residential entrance substation 4 comprises a call unit 43 including a microphone and a speaker that allow a visitor P to speak with a residence, a call button 45 that serves as a call means for a visitor P to call a resident, a camera 44 that shoots a video of a person operating the residential entrance substation 4 of the residence, a CPU 41 that controls the operation of the residential entrance substation 4, and an interface 42 that connects the residential entrance substation 4 with external devices, such as the control unit 5. In addition, the residential entrance substation 4 transmits a video V2 (see FIG. 5) shot by the camera 44 to the control unit 5 via the residential master station 3.

The control unit 5 comprises a CPU 51 and an interface 52 that connects the control unit 5 to the main entrance station 2, the cloud server 6, and the residential master stations 3 and the electronic locks 8 of the residences. The CPU 51 includes a check unit 53 that checks the videos V1 of the visitors P against the video V2 of the person who has operated the call button 45 of the residential entrance substation 4.

As shown in FIG. 4, the storage unit 63 stores a visitation history table that associates videos V1 of visitors P, the residence IDs of the residences to be visited by the visitors P, the release times at which the electronic lock 7 of the main entrance was released by residents of the housing to admit the visitors P with one another. Preferably, the timing at which a video V1 of each visitor P is shot is when the electronic lock 7 of the main entrance is released by the control unit 5. Note that any information that can uniquely identify a residence, such as a room number or an otherwise uniquely assigned number can be used as a residence ID.

The control unit 5, upon receiving from a residential master station 3 a video V2 shot by the camera 44 of the residential entrance substation 4 and the residence ID of the residence where this station 4 is installed, delivers the video V2 to a check unit 53. The check unit 53 uses facial recognition to check the person in the video V2 shot by the camera 44 against the videos V1 retrieved from the visitation history table maintained in the storage unit 63. The following provides detailed description.

Figure 5A:
FIGS. 5A, 5B, 5C and 5D show examples of information transmitted from the residential entrance substations of residences to a control unit via the respective residential master stations.

For example, as shown in FIG. 5A, the check unit 53 checks the person in the video V2 from the residential entrance substation 4 against the visitors P in the videos V1a-V1d stored in the visitation history table, and extracts the residence ID "101" associated with the matching video V1a. As the extracted residence ID "101" matches the residence ID "101" received from the residential master station 3, the control unit 5 calls the residential master station 3 without invalidating or canceling the operation of the call button 45. The electronic lock 8 of the residence with the residence ID "101" may be configured to be automatically released at this moment. The automatic releasing of the lock in this manner can save the resident from having to do so. Note that the time at which the call button 45 of the residential entrance substation 4 is depressed may be registered as the "calling time" as shown on the table.

Figure 5B:

In the case shown in FIG. 5B, as there is no video V1 that matches the video V2, the control unit 5 invalidates the operation of the call button 45 so as to prevent the residential master station 3 from being called. It should be noted that when the call button operation is invalidated, the speaker of the residential entrance substation 4 may issue a voice alert that the call is invalid.

Figure 5C:

Additionally, in the case shown in FIG. 5C, the residence ID "101" extracted based on the matching video V1a is different from the residence ID "102" received from the residential master station 3, the control unit 5 invalidates the operation of the call button 45 so that the residential master station 3 is not called.

Figure 5D:

Furthermore, for example, the system may be configured to make the operation of the call button 45 valid within a predetermined period of time, such as ten minutes. This is because the security of the collective housing may be compromised if a call by a visitor P remains valid for an extended period of time. For example, as shown in FIG. 5D, the control unit 5 determines that thirty minutes has elapsed from the release time of 12:30 to the call time of 13:00 and proceeds to invalidate or cancel the operation of the call button 45.

The following describes the operation of the intercom system 1 constructed as described above.

When a visitor P touches selection buttons 26 on the main entrance station 2 to select the residence that the visitor wants to visit and touches the call button 45, the control unit 5 calls the residential master station 3 of the selected residence. Subsequently, when a resident operates the residential master station 3 to release the electronic lock 7 of the main entrance of the collective housing, the camera 24 of the main entrance station 2 shoots and transmits a video or image of the visitor P to the control unit 5. The control unit 5 in turn transmits the video V1 received from the main entrance station 2 along with the received residence ID to the cloud server 6. The cloud server 6 associates the received video V1 and the received residence ID as it stores information about these in the visitation history table of the storage unit 63.

Subsequently, when the call button 45 of the residential entrance substation 4 is depressed, the camera 44 of the residential entrance substation 4 shoots a video V2 of the person who has pressed the call button 45 and transmits the video V2 to the residential master station 3. The residential master station 3 transmits the received video to the control unit 5 along with the residence ID of the residence.

When the control unit 5 receives the video V2 and the residence ID from the residential master station 3, the check unit 53 uses facial recognition to check the person in the video V2 against the visitors P in the videos V1 in the visitation history table. If the check indicates a match, the residence ID associated with the matching video V1 is read from the storage unit 63 and compared with the residence ID received from the residential master station 3. If a match occurs, the operation of the call button 45 is not invalidated, the electronic lock 8 of that residence is released. Conversely, if the residence IDs are different, i.e., a match does not occur, the operation of the call button 45 is invalidated.

The intercom system 1 thus configured checks the visitors P in videos shot by the camera 24 of the main entrance station 2 against the person who has operated the call button 45 of a residential entrance substation 4, and compares the residences called by the visitors P from the main entrance station 2 against the residence whose call button 45 has been operated 45. As the intercom system 1 is configured not to call the residential master station 3 unless a match occurs, the intercom system 1 prevents any person other than the right person P from calling the residential master station 3. The intercom system 1 further avoids the danger of receiving, and/or interacting with, a suspicious or dubious person that has entered the collective housing by tailgating so as to enhance the security of the collective housing. Moreover, as collective housing tends to have similar looking entrances arranged side by side, the intercom system 1 also has a beneficial effect of preventing a visitor P from operating the residential entrance substation 4 of an adjacent room inadvertently or by mistake.

The present invention is not limited to the foregoing embodiments and can be carried out with the arrangements of various parts altered as desired without departing from the spirit of the present invention. For example, the storage unit 63 may be included in the control unit 5, or the functionality of the control unit 5 may be implemented in the cloud server 6.

What is claimed is:

1. An intercom system for collective housing having a plurality of residences, the intercom system comprising:
   a main entrance station that includes a selection means for allowing one or more visitors to select a residence to visit in the collective housing, the main entrance station further including a camera for shooting images of the one or more visitors;
   a residential master station installed inside of each residence in the collective housing;
   a residential entrance substation for each residence that includes a call means for calling the residential master station of the residence and a camera for shooting a video of a person who has operated the call means;
   a control means for controlling the intercom system; and
   a storage means for storing the image of each visitor and a first residence ID that indicates the residence selected by the visitor using the selection means by associating the image of the visitor with the first residence ID;
   wherein the control means includes a check means for checking the videos of the one or more visitors against the video of the person who has operated the call means; and
   wherein upon determining that the check by the check means indicates a match and upon determining that the first residence ID does not match a second residence ID that indicates the residence in which the call means of the residential entrance substation has been operated, the control means invalidates the operation of the call means.

2. The intercom system according to claim 1, wherein the storage system is provided in a cloud server.

3. The intercom system according to claim 1 further comprising an electronic residential lock on a front door of each of the residences;
   wherein upon determining that the check by the check means indicates a match and upon determining that the first residence ID matches the second residence ID, the control means releases the electronic residential lock.

4. The intercom system according to claim 1, wherein a main entrance of the collective housing includes a main entrance electronic lock;
   wherein the residential master station of each residence includes a release means for releasing the main entrance station electronic lock, and
   wherein the control means invalidates said operation of the call means after a lapse of a predetermined period of time from the operation of the selection means by the visitor.

5. The intercom system according to claim 1, wherein the storage means includes a visitation history table that stores and associates the videos of the one or more visitors, first residence IDs, release times at which the electronic lock of the main entrance is released by residents of the collective housing to admit the one or more visitors with one another.

6. The intercom system according to claim 1 further comprising an electronic residential lock on an entrance of each of the residences;
   wherein upon determining that the check by the check means indicates a match and upon determining that the first residence ID matches the second residence ID, the control means calls the residential master station of the residence in which the call means of the residential entrance substation has been operated.

7. The intercom system according to claim 1, wherein when the operation of the call means is invalidated, the residential entrance substation that has been operated issues an alert indicating that the operation of the call means is invalid.

\* \* \* \* \*